3,696,030
PROCESS AND APPARATUS FOR DE-SLIMING VEGETABLE OILS
Heinz Otto Schumacher, 26 Hoperfeld, 205 Hamburg 80, Germany
Filed Sept. 15, 1970, Ser. No. 72,419
Int. Cl. B01d 11/04
U.S. Cl. 210—21   9 Claims

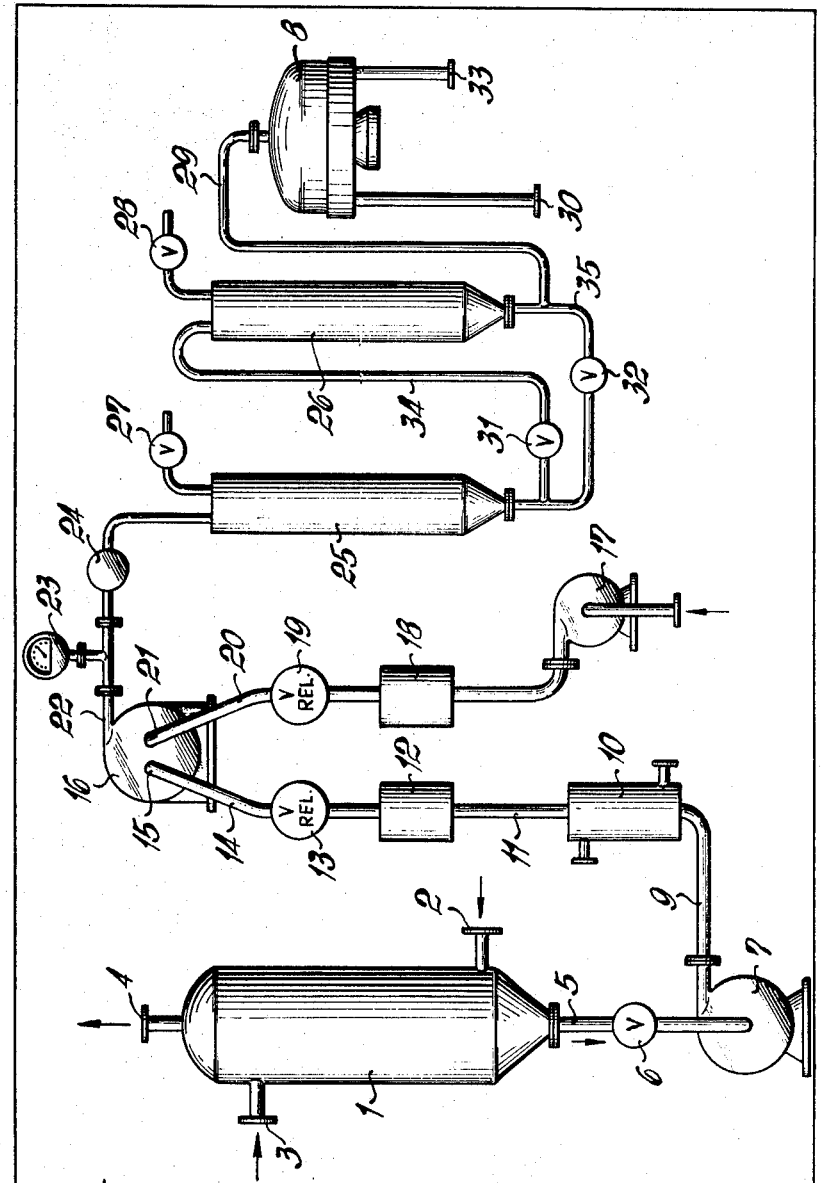

ABSTRACT OF THE DISCLOSURE

A process for de-sliming vegetable oils which are obtained by extraction and Miscella distillation, particularly for de-sliming soy bean oil, in which the oil to be de-slimed is reacted with water in swelling or steeping containers. The oil is separated from the water-soluble phosphatides in a separating stage. Gas-free oil and gas-free water are used for the de-sliming operation. The de-sliming operation and the subsequent separation of the oil from the phosphatides is carried out in a gas-free medium.

---

The present invention relates to a process and to an apparatus designed for removing slime from vegetable oils which are obtained by extraction and Miscella distillation, particularly for de-sliming soy bean oil, in which the oil to be deslimed is reacted with water in steeping containers, whereupon the oil is separated from the water-soluble phosphatides in a separating stage and the de-sliming process and subsequent separation of the oil from the phosphatides is carried out in a gas-free medium.

It is known in the prior art to deslime vegetable oils and fats in a continuous process in which a mixture consisting of equal portions of oil and water is circulated in a closed cycle with the aid of a heat treatment. It is the object of this prior art arrangement to purify the oil as much as possible and to separate therefrom the economically insignificant slimes which represent mostly a waste product and are water-soluble, for example the phosphatides. A separation, which is generally carried out in centrifuges, succeeds only because the phosphatides combine or mix with water, and accordingly become specifically heavier than the oil.

The present invention equally relates to a process and to the apparatus pertaining thereto designed for the treatment, i.e. the desliming, of a vegetable oil which is obtained by extraction and Miscella distillation; yet the object of the inventive treatment particularly of soy bean oil consists not only in simply cleansing and freeing the oil to a greater extent from the relatively large percentages of phosphatides present in the oil (up to 3%), which involves a considerable saving of neutral oil during the refining of the oil, but actually resides in extracting this phosphatide, which is present in soy bean oil as lecithin, to a still greater extent also because this lecithin is an extremely important and also very expensive raw material for the food, pharmaceutical and cosmetic industries. Processes of a chemical nature intended to increase the lecithin recovery must be eliminated in this connection since they render the lecithin totally unusable for the food industry and partially unusable for the pharmaceutical industry.

The present invention is therefore concerned with and directed to a process and to an apparatus for carrying out this process, designed for desliming vegetable oils which are yielded by extraction and Miscella distillation, particularly soy bean oil, with the object that the desliming and, respectively, the hydration be carried out in a manner such that as much lecithin as possible is yielded, and therewith also a very well purified oil.

The prior art processes do not solve this problem. According to the Miscella distillation which is generally carried out in three stages, the third one of which is maintained under a low vacuum and in which hexane is expelled from the vegetable oil by virtue of the introduction of direct steam, and from which the vegetable oil is removed free from air, the oil is further conveyed to the desliming and, respectively, hydration stages—again at the atmospheric pressure, in other words, in contact with air—whereby the objects of recovering greater quantities of lecithin and achieving a better degree of desliming of the oil could not be obtained, as will be further explained hereinbelow.

Even the use of water being free from air could alone not remedy this situation.

The prior art process for introducing an inert gas known from the German Auslegeschrift 1,274,429 pertaining to the margarine industry is used therein because the fats have a high content of unsaturated fatty acids and because they are sensitive to oxygen. For the lecithin production, on the other hand, the introduction of such a gas cannot result in an improvement, as will be further explained hereinafter.

The present invention is based on the knowledge that an improved separation of the vegetable oil from the water-soluble phosphatide, particularly the separation of soy bean oil from lecithin, is possible if the gases penetrating into the oil and/or being present therein, particularly air, are particularly taken into account. This will simultaneously lead to a better purification of the oils from the phosphatides and at the same time also to a greater recovery of the phosphatides, i.e. in the case of soy bean oil, this will entail an improved yield of the very desirable lecithin.

It had been found initially that the phosphatide is so finely dispersed in the oil that no separation appeared possible. Since, however, most phosphatides are dissolved in water, the combination of phosphatide and water—once it has been established—becomes specifically heavier than the oil and can be separated therefrom in centrifuges, as has already been indicated hereinabove. In order, however, to assure that the water will have the best access possible to the phosphatide, and specifically in the so-called swelling or steeping process, the phosphatide must be freely positioned in the oil; in other words, because of its great affinity to gases, and hence also to inert gases and, respectively, air, care must be taken to assure—in accordance with the present invention—that, during the desliming operation, as little as possible, or none at all, will collect around the individual phosphatide particles being positioned in the oil, thus virtually shrouding or jacketing the same. After such "shrouding," the water can no longer have access to the phosphatide and the purification of the oil as well as the improvement of the phosphatide recovery or yield will not be possible.

This has been found also during prior attempts to repeat the swelling or steeping operation several times, as a result of which the yield of phosphatide and, respectively, the purification of the oil could not be increased and, respectively, improved. In this connection it is important to know that, for example, 1 ton of oil can absorb about 1 kilogram of air in genuine solution.

Thus, the afore-mentioned objects directed toward a better separation of the vegetable oil from the water-soluble phosphatide, particularly the separation of the soy bean oil from lecithin, and therewith the increase of the lecithin recovery and purification of the oil, are effectively obtained, according to the present invention, by virtue of preventing the access of aid to the oil to be purified and, respectively, to be deslimed, during the desliming and, respectively, hydration, and to the oil-water mixture during further process steps.

The process of the present invention is thus characterized in that gas-free oil and gas-free water are employed for the desliming operation and in that the desliming inclusive of the subsequent separation of the oil from the phosphatides are carried out in the gas-free medium.

Accordingly, when the water can get to the phosphatide in a better manner, a further advantage that is afforded is a significantly lower water consumption for the swelling or steeping operation proper. This immediately results in the advantage that the ultimately separated phosphatide and, respectively, lecithin will be much drier. The same holds true for the oil, so that the expenditure regarding the subsequent lecithin and oil drying installations may be maintained substantially smaller.

In order to further reduce the water consumption in the desliming installation, it is possible according to the present invention for the purpose of reducing the solubility of the water in oil, to leave at the inlet of the desliming installation a constituent of over 0.2% hexane in the oil that is to be deslimed, since this hexane may be separated or expelled concomitantly in generally following drying stages. Heretofore, this low value of 0.2% hexane could be achieved always at higher costs, for example due to a better vacuum in the Miscella distillator or oil degasser, which thus was disadvantageous but necessary because any exceeding of its represented an element of danger during the treatment in the heretofore open containers of the desliming installation. The hexane proportion, i.e. with respect to the total volatile material in the oil to be deslimed, is now no longer that critical according to the present invention.

Moreover, by virtue of the fact that the water can now gain access to the phosphatide more rapidly, the swelling or steeping time time may be reduced—according to a further embodiment of the process proposed by the present invention—to from one to 10 minutes at the most, as compared to 30 to 60 minutes necessary heretofore. The shortest swelling time will be achieved with the premixing being engaged.

An apparatus of the type mentioned hereinabove for carrying out the process proposed by the present invention is characterized in that all of the accessories and parts or elements of the desliming installation including supply of raw-materials and the subsequent separating stage are so provided that the access of gasses and, respectively, atmospheric air to the material to be treated and, respectively, having been partially treated is effectively prevented, and that this apparatus essentially consists of the following elements:

An oil pump which presses the oil being free from air into the desliming device;

A heat exchanger which brings the oil having been introduced to the required treating temperature;

Adjacent thereto an oil quantity measuring means with an oil quantity regulating valve connected therebehind;

A water pump which pumps the water being free from air (the boiler feeding water) via a water amount measuring means with a water amount regulating valve connected therebehind;

A pre-mixing pump, one inlet of which is connected with the outlet of the oil quantity regulating valve; the other inlet thereof being connected with the outlet of the water amount regulating valve, and the outlet of which is connected with a pressure gauge and a mixer;

Either one or several swelling or steeping containers (residence time containers) being disposed in series behind the mixer with one vent valve each required only the first time the apparatus is put in operation;

And a centrifuge having a closed construction and being disposed behind the last swelling container.

Furthermore, the swelling containers in the desliming installation may be connected with pipe lines having a diameter such that the flow velocity of the material to be swelled is higher in the pipe line sections in which the material flows vertically upwardly than the sinking speed of the swelled phosphatides.

One embodiment of the present invention is illustrated in the accompanying drawing and will be further described hereinafter.

The accompanying drawing illustrates an apparatus for desliming soy bean oil. The process proposed by the present invention is also suitable, however, for desliming other oils, even though it has already shown the best results for soy bean oil.

The desliming apparatus or installation shown is interpolated between the Miscella distillation, in the stages of which hexane is expelled from the soy bean oil, and the driers for the oil and, respectively, the lecithin slime.

Reference numeral 1 was used to identify a container of a last stage of the Miscella distillation into which direct steam is introduced at 2, while the soy bean oil is introduced at 3 (approximately 92% oil with 3% lecithin, 5% hexane and 0.4% water). The hexane gasses escape at 4, and practically air-free oil may be removed at 5 since the container 1 is at a low vacuum of about 300 torr. This oil, for example 2,200 l./h., passes via a valve 6 to an oil pump 7 at the inlet of the inventive desliming installation. In the pump 7, the oil obtains or is given approximately 0.1 to 0.8% and preferably 0.75% total volatile matter which is composed of 0.25% hexane and 0.5% water. Furthermore, the oil contains approximately 2.2 to 3% lecithin—depending upon the quality of the soy beans—at a temperature of for example 80 to 90° C.

According to the known state of the art, this oil came often into contact with air between the pump 7 and a separator behind the desliming installation so that the objects sought to be obtained by the present invention could not be achieved in the prior art. According to the present invention, the entire desliming apparatus starting with this pump 7, i.e. from the last Miscella distillation stage which may also be a last stage of an oil degassing installation, up to and inclusive of the centrifuge 8 separating the oil from lecithin, is so designed and constructed that no air can reach the material to be treated. This is illustrated on FIG. 1, diagrammatically showing an airtight housing enclosing the apparatus in toto with means to evacuate. It will be, however, obvious, to those skilled in the art, that separate de-gassing means may be provided for each stage of the apparatus or for any combination thereof.

From the pump 7, the air-free oil flows through the pipe line 9 and then through a heat exchanger 10 in which it is cooled to the treating temperature of approximately 60 to 80° C., and from there through the pipe line 11, through an oil quantity measuring means 12 with an oil quantity regulating valve 13 being connected therebehind, and thereafter through the pipe line 14, and through one of the inlets 15 of a premixing pump 16 ultimately into the latter.

A water pump 17 presses water being free from air, for example air-free boiler feeding water, for example 44 l./h., i.e. 2% volume addition and, respectively, a ratio of 1:50, through a water quantity measuring means 18 with a water quantity regulating valve 19 being connected therebehind, through a pipe line 20 and through the other inlet 21 of the pre-mixing pump 16.

One outlet 22 of the pre-mixing pump 16 is connected with a pressure gauge 23 and a mixer 24. The pressure ahead of the mixer may amount to 6 atmospheres, for example. Behind the mixer 24, which may consist of a nozzle aggregate for purposes of transforming the pressure into a high velocity of flow for forming many vortices to produce an intimate intermixture, the mixture now to be treated in the desliming and, respectively, hydration stages proper is subjected still to a slight excess pressure which at this point may amount to approximately 0.2 atmosphere. The mixture consists, for example, of 94.75% oil, 2.5% lecithin, and 2.75% total volatile matter, in which are contained 0.25% hexane and 2.5% water.

From the mixer 24, the mixture to be treated passes into the swelling or steeping containers 25 and 26 which comprise each at least one vent valve 27 and 28. These vent valves 27 and 28 are needed once and in each case when first starting the operation of the installation. The material to be further treated remains in the swelling containers 25 and 26 for example from one to ten minutes, preferably from four to six minutes, and for this reason these containers are also called residence time containers. It is also possible to so provide for several containers in such a manner that, by means of short-circuiting within the course of flow, the residence time is adjustable, for example by means of the valves 31 and 32 in the installation shown in the accompanying drawing. If 31 is closed and 32 opened, the second swelling container 26 is turned off and, in other words, short-circuited from the point of view of flow.

In these swelling containers, sufficient time must be allowed for the water to be added on or accumulated to the lecithin. In view of the fact that no access of air took place to the material to be treated theretofore or prior thereto, i.e. from the last stage of the Miscella distillation, the lecithin is positioned practically freely in the oil; the equally air-free water can gain access thereto without benig impeded, and therefore not only the residence times are considerably shortened by means of the process proposed by the present invention as compared to the state of the art, but also there are no stirring mechanisms required any more of any kind in the swelling containers. They may be used only as an exception. In order that an approximately uniform flow velocity be maintained, the swelling containers 25 and 26 may have a diameter and length ratio of 1:10 and are arranged at right angle in a manner such that the material enters at the top and is discharged at the bottom. The pipe line sections 34 and 35, in which the material flows upwardly, have a diameter such that the flow velocity of the material to be swelled is greater or higher than the sinking speed of the swelled phosphatides.

Finally, the oil and the lecithin bound to the water pass from the last swelling container 26 through the pipe line 29 into the centrifuge 8 from which the lecithin slime consisting of approximately 42% lecithin, 21% oil and 37% water may be removed at 30, and at 33 the oil, consisting of approximately 99.2% oil, 0.15% lecithin, 0.4% water and 0.25% hexane.

When all of the aggregates and pumps are adjusted accordingly, the recovery or yield may be carried out in a continuous operation, i.e. continuous removal at the centrifuge 8, and the entire desliming installation runs continuously.

Cycles, i.e. repeated swelling or additions of already swelled lecithin to the oil still to be hydrated, are not necessary.

With the heretofore known devices, the following values were obtainable, depending upon the type and construction of the installations behind the centrifuge 8: lecithin slime:

29–42% lecithin
15–21% oil
56–37% water

Oil: 0.4 to 0.8 residual lecithin content.

Hence, there results for the lecithin recovery a considerable increase of the yield and therewith simultaneously a considerably purer soy bean oil which can be refined at substantially reduced losses. If one assumes as means value from the heretofore obtainable residual phosphatide and, respectively, lecithin contents 0.6%, at a lecithin content of 2.4% in the oil to be deslimed, there results a lecithin yield of 75% with simultaneously high losses in the subsequent refining stages.

A residual lecithin content of 0.15% lecithin in the deslimed oil that is obtainable by means of the present invention with the same starting product results in a lecithin yield of 94% with simultaneously low losses in the successive refining stages.

I claim:

1. A process for de-sliming vegetable oils containing water soluble phosphatides which are obtained by extraction and Miscella-distillation, particularly for de-sliming soja-bean oil, comprising the steps of:
   de-gasing said oil to be de-slimed;
   reacting said oil to be de-slimed with gas-free water in a steeping stage; and
   separating the steeped de-gased oil from the water-soluble phosphatides in a gas-free separating stage; whereby said oil is freely isolated and the removal of highly purified de-slimed oil is continuous.

2. A process for de-sliming vegetable oils as claimed in claim 1, characterized in that the oil to be de-slimed has a hexane content of over 0.2%.

3. A process for de-sliming vegetable oils containing water soluble phosphatides which are obtained by extraction and Miscella-distillation, particularly for de-sliming soja-bean oil, as claimed in claim 1, further comprising the steps of; premixing said oil with gas-free water, said step of premixing interposed after the step of de-gasing.

4. A process for de-sliming vegetable oils containing water soluble phosphatdies which are obtained by extraction and Miscella-distillation, particularly for de-sliming soja-bean oil, as claimed in claim 1, said step of steeping carried out for up to 10 minutes hydration time.

5. A process for de-sliming vegetable oils containing water soluble phosphatides which are obtained by extraction and Miscella-distillation, particularly for de-sliming soja-bean oil, as claimed in claim 1, said step of de-gasing, comprisnig the step of; treating said oil with steam.

6. A process for de-sliming vegetable oils containing water soluble phosphatides which are obtained by extraction and Miscella-distillation, particularly for de-sliming soja-bean oil, as claimed in claim 1, said step of separating including the step of centrifuging said slimed oil under vacuum to separate lecithin slime and further including the step of refining said slime whereby freely isolated lecithin is obtained as a by-product.

7. An apparatus for de-sliming vegetable oils which are obtained by extraction and Miscella-distillation, particularly for de-sliming soja-bean oil, comprising:
   means to de-air said oil;
   means to de-slime said oil;
   an oil pump and conduit means between siad means to de-air and said means to de-slime;
   a heat-exchanger to control the treating temperature of said oil;
   an oil flow meter and control valve connected behind said heat-exchanger;
   a supply of de-aired water;
   a water flow-meter and control valve, with a pressure gauge and a mixer on the outlet side;
   a water pump with conduits to pump the de-aired water through said water flow-meter and control valve;
   a premix pump having one inlet connected to the outlet of said oil control valve and the inlet connected to the outlet of said water flow control valve;
   at least one swelling container in conducit connection behind said mixer;
   a closed centrifuge in conduit connection behind said at least one swelling container; and
   evacuating means to maintain said apparatus elements under vacuum.

8. An apparatus according to claim 7, characterized in that, in the de-sliming installation, swelling containers are connected with pipe lines having a diameter such that the flow velocity of the material to be swelled is higher in the pipe line sections in which the material flows vertically upwardly than the sinking speed of the swelled phosphatides.

9. An apparatus for de-sliming vegetable oils which are obtained by extraction and Miscella-distillation, particularly for de-sliming soja-bean oil, as claimed in claim 7, said means to keep said apparatus elements under vacuum, including means to do so at a vacuum of about 300 torr.

References Cited
UNITED STATES PATENTS

| | | | |
|---|---|---|---|
| 2,320,970 | 6/1943 | Lansing | 260—412.4 |
| 2,752,377 | 6/1956 | McDohald | 260—412.4 X |
| 3,083,365 | 3/1963 | Roxas | 260—412.2 |

FRANK A. SPEAR, Jr., Primary Examiner